Feb. 18, 1941.  W. KÖHLER  2,232,644
APPARATUS FOR THE MANUFACTURE OF MOLDED ARTICLES FROM
SOLID OR SEMISOLID POLYMERIZATION PRODUCTS
Filed Oct. 13, 1937
Fig.1.
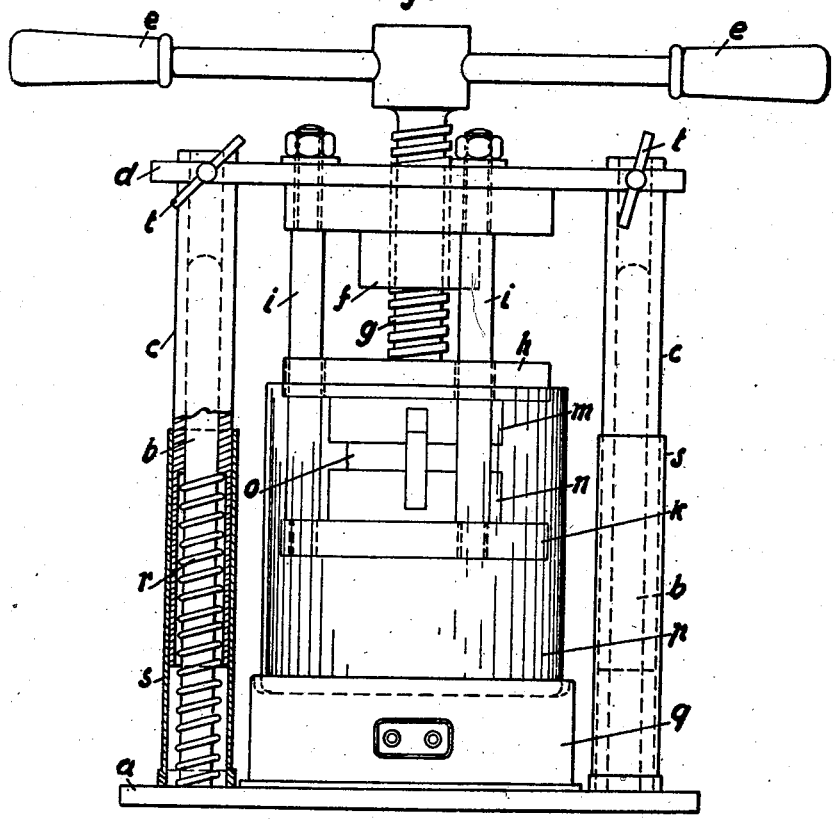
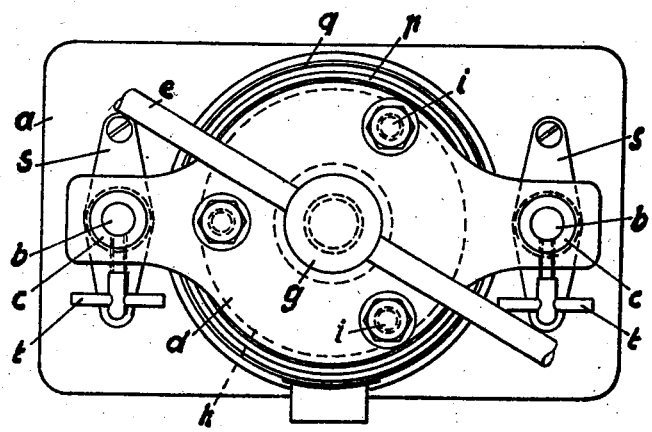
Fig.2.
Inventor:
Walter Köhler
by S. Sokal,
Attorney.

Patented Feb. 18, 1941

2,232,644

UNITED STATES PATENT OFFICE 2,232,644

APPARATUS FOR THE MANUFACTURE OF MOLDED ARTICLES FROM SOLID OR SEMI-SOLID POLYMERIZATION PRODUCTS

Walter Köhler, Munich, Germany

Application October 13, 1937, Serial No. 168,730
In Germany October 14, 1936

2 Claims. (Cl. 18—5)

This invention relates to a process and apparatus for the manufacture of mold substances or articles from polymerization products which are obtained by heating unsaturated liquid organic compounds, such as acrylic acid or vinyl compounds.

These very difficultly moldable substances or articles are, in accordance with this invention, pressed between molds in a heating fluid at a temperature of 160° at atmospheric pressure and are then cooled slowly whilst the pressure is maintained. As a suitable heating fluid is chosen a fluid, for example oil, glycerine or paraffin, the boiling point of which is essentially higher than the temperature of use of the bath. The novel method makes possible the manufacture of molded articles or substances which are free from bubbles and have any desired external form without the characteristics of the starting material, for example its transparency, suffering in any way. It also enables flaws or cracks formed in the article in use to be removed without trace, broken pieces to be replaced and furthermore molded articles made according to this method can be molded in with foreign bodies such as metal parts.

The temperature of the heating fluid depends essentially on the size and the form of the object to be produced. It can be increased on the treatment of larger objects and more difficult molds to about 240°.

It is important that at the end of the pressing operation the molded article be cooled under pressure. The best results are obtained by a slow cooling. For this purpose a heated bath may advantageously be employed, or even the heating fluid previously used.

An advantage of the invention consists in that, if desired, the article can be coloured during manufacture, the desired colouring matter being added to the heating fluid. A clear tinting can be obtained by experience with the most finely distributed colouring matter.

The method according to the invention can be carried out in the simplest manner by means of a suspended press which is immersible in the heating fluid. Either a pair of dies similar to those of a stamping press can be used, or two relatively movable presser plates, which carry between them the mold parts of the workpiece. So that it shall not be necessary to vary the position of the container for the heating fluid, the press is made vertically adjustable in its bearings. The upward movement of the press can be assisted by springs or effected automatically.

The arrangement of the suspended press has, apart from the ease in handling and free accessibility, above all also the advantage that during pressing no pressure is exerted on the bottom of the container for the heating fluid. In this way it is possible to employ a container made of glass or other transparent material, which enables the alterations of form of the material being worked, the position of the mold parts and the progress of the pressing operation to be observed.

In order that the invention may be fully understood I will now describe one embodiment of a press for carrying out the novel method by way of example by reference to the accompanying drawing, which shows in Fig. 1 a side view and in Fig. 2 a top plan view of such a press.

On a base plate $a$ are secured two or more uprights $b$, which serve as guides for the longitudinally displaceable tubes $c$. The latter carry a tie bar $d$ on which is suspended the press device. The press consists of a spindle $g$, provided with handles $e$ and guided in a socket $f$, and presser plates $h$ and $k$. The presser plate $h$ on the spindle $g$ is guided on stay bolts $i$, which themselves carry the opposite presser plate $k$. Between the plates $h$ and $k$ are disposed the mold parts $m$ and $n$ with the substance to be treated $o$. The press device is shown on the drawing as extending about halfway into a container $p$ made of transparent material. The container $p$ serves to hold oil, glycerine, paraffin or the like, and is removably arranged on an electric or other heating device $q$.

In the position illustrated, the press device is urged in the upward direction under the influence of pressure springs $r$, which are covered by tubes $s$ secured to the base plate $a$. In the lower end position the press device is secured by clamping screws $t$ acting on the uprights $b$.

The process according to the invention is carried out with the aid of the above described press in the following manner:

The springs $r$ are so dimensioned that when the press device is in the upper end position the presser plate $k$ is above the upper edge of the vessel $p$. In this position the two mold parts $m$ and $n$, together with the polymerization product previously prepared in the desired form and size, are arranged between the presser plates $h$ and $k$, care being taken that the inner side of the mold parts is as smooth and clean as possible. The charged press is now lowered into the heating fluid, for example oil, which has in the meantime been heated to about 200° and the clamping screws $t$ are tightened. The spindle $g$ is then slowly screwed and after each half to three-quarter rotation a slow pause is interpolated in order to give the material the opportunity of distributing itself uniformly in the mold. The operation can be observed through the transparent container. On working with difficult molds the pressing operation is finished after about five minutes, which period, however, can be determined by observation through the container. The finished molded article can either be cooled with the heating fluid or the press can be brought into the upper end position by releasing the clamping screws $t$ and the molded article left to drain over the container $p$ until it is completely cold. Only then is the press opened and the mold piece taken out for final polishing and removal of burrs, etc.

I claim:

1. Apparatus for manufacturing a molded article from a polymerization product obtained by heating an unsaturated liquid organic compound, such as an acrylic acid or a vinyl compound, comprising the sub-combination of: a support; a yoke vertically movable in said support; springs carried by said support, said springs tending normally to force said yoke into its extreme uppermost position in said support; a press suspended from said yoke, said press including presser plates, means for moving said plates towards and away from one another, and open molds carried by said plates, for forming said article, and means for displacing said presser plates towards and away from one another; and an open transparent container for heating fluid disposed beneath and independently of said press in which said presser plates may be immersed on lowering of said vertically movable yoke; means for retaining said yoke in any desired position of vertical adjustment; and means for heating said fluid in said container.

2. A molding apparatus for manufacturing a molded article comprising a supporting member, suspension means movable in said supporting member, spring means on said supporting member and tending to normally urge said suspension means into their uppermost position in said supporting member, a press suspended from said suspension means, said press including presser plates, means for moving said plates towards and away from one another, open molds carried by said plates for forming said article, means for displacing said presser plates towards and away from one another, an open transparent container for heating fluid disposed beneath and independently of said press in which said presser plates may be immersed on lowering of said suspension means, means for retaining said suspension means in any desired position of vertical adjustment and means for heating said container and fluid therein.

WALTER KÖHLER.